May 19, 1936.　　　　P. HALLOT　　　　2,041,603
AUTOMATIC BRAKE FOR RAILWAY TRAINS
Filed July 10, 1929　　　2 Sheets-Sheet 1
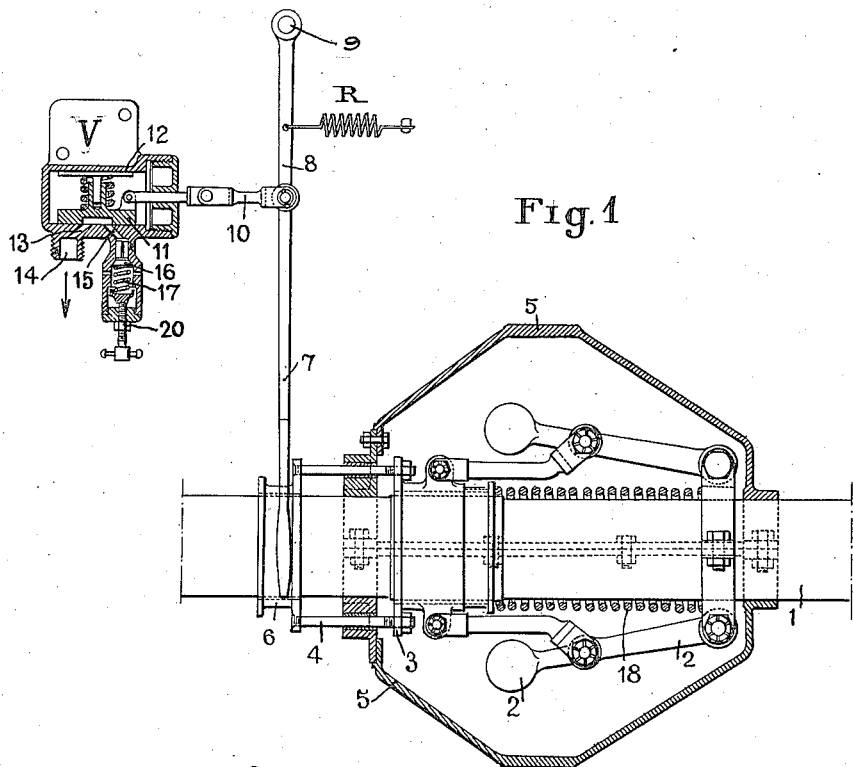

May 19, 1936. P. HALLOT 2,041,603
AUTOMATIC BRAKE FOR RAILWAY TRAINS
Filed July 10, 1929 2 Sheets-Sheet 2
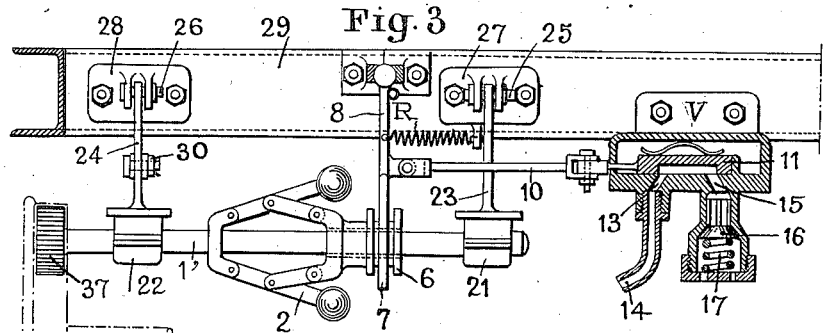
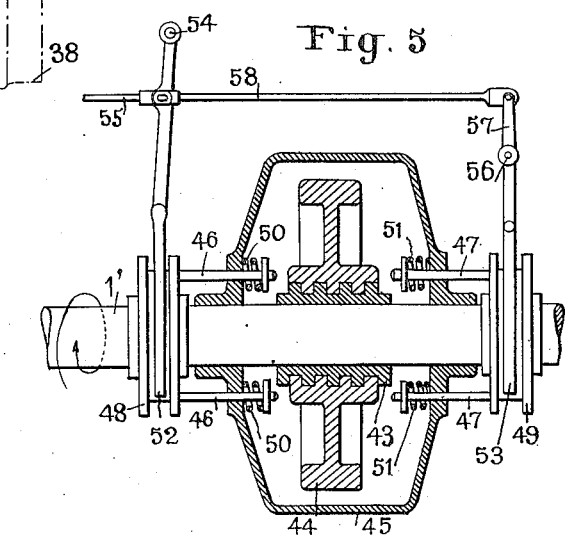
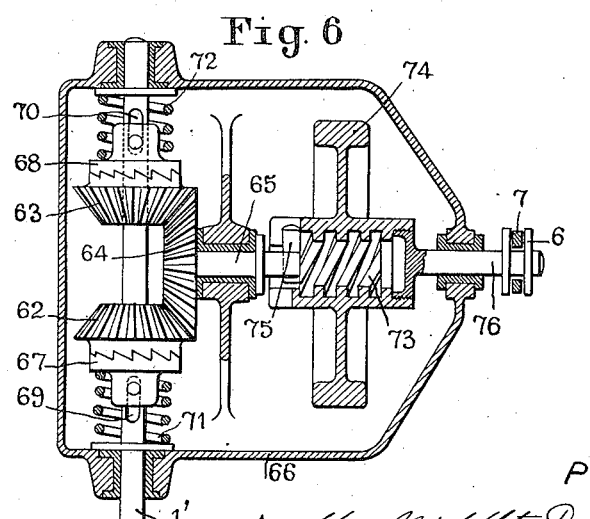
Inventor:
Paul Hallot,
by Spicer Middleton Donaldson & Hall
Attys.

Patented May 19, 1936

2,041,603

UNITED STATES PATENT OFFICE 2,041,603

AUTOMATIC BRAKE FOR RAILWAY TRAINS

Paul Hallot, Paris, France

Application July 10, 1929, Serial No. 377,290
In France July 11, 1928

5 Claims. (Cl. 188—181)

This invention relates to continuous brakes for railway trains, that is to say braking systems wherein all the vehicles are provided with brakes all of which are controllable from a single point. The object of the invention is the combination of a number of means restraining the operations of levers which, according to the conditions proposed in August 1927 by the International Railway Union, are imposed on all the goods wagons of the European railway systems.

These operations of regulation charging not controllable by the engineer, and varying according as to whether it is a question of a wagon running empty or loaded, and whether the run is on the level or on inclines, are subjected to the risk of error or even omission, under unfavourable conditions, which may cause destruction of material or accidents.

The object of the invention is to release automatically and partially the fluid pressure in any brake cylinder when the speed of the associated wheel falls to a predetermined value less than that of normal running whereby skidding of the wheels on the rails is prevented.

In the annexed drawings:

Fig. 1 is a sectional view of the self-regulating valve which assures the proportionality of the braking to the load and avoids locking of the wheels.

Figs. 2 and 3 show a side elevation and end elevation respectively of an arrangement of the control means for the regulating valve.

Fig. 4 shows a modification with control by a belt.

Fig. 5 shows a valve regulator actuated automatically by inertia.

Fig. 6 shows a reverser for the control of the said valve regulator.

With reference to Fig. 1, the automatic regulating valve V in communication with the brake cylinder H is controlled by a regulator, such as for example the centrifugal regulator 2 fitted on one of the axles 1 of the vehicle, and the movable collar 3 pressed back by the helical spring 18 controls the rods 4 rigidly connected to a flanged collar 6, with which engages the fork 7 of a lever 8 fulcrumed around an axis 9 fixed to the framework.

The fork 7 is arranged to remain always in engagement with the collar 6 and is not influenced either by the lateral play of the axle 1 or by the vertical displacement of the framework.

By means of a connecting rod 10 the lever 8 controls a slide valve 11 mounted in a casing 12. This slide valve can put into communication two orifices; one 13 communicating by a tube with the chamber of the brake cylinder; the other 15 communicating with the atmosphere: but it is closed by a regulating valve 16, regulated by an adjustable spring 17. A spring 18 tends to bring back the regulator into the resting position, and the spring R maintains the slide valve in position.

The device being at rest, in the position in the drawing, the fork 7 is kept against the collar 6 by the spring R. The slide valve 11 is mounted in such a way that it puts the orifices 13 and 15 into communication, arrangements variable with the objects pursued.

When the car wheels 38 are in rotation the regulator 2 carries along the fork 7, a movement which displaces the slide valve 11 towards the right (Fig. 3), thereby cutting off all communication between the cylinder and the atmosphere. But if from excess of pressure, or for any reason whatever, the wheels tend to jam, this slowing up will reduce the action of the regulator 2, and under the preponderant action of the spring 18 the orifices 13 and 15 will again be put into partial or fully open communication permitting the excess air to escape gradually through the port 15 to the atmosphere, by unseating the valve 16. However, the valve 16 is seated so as always to maintain in the cylinder a predetermined minimum pressure regulated by the compression given to the spring 17 by the screw 20.

The regulator 2 which acts on the escape valve V is characterized by the fact that it is contrived in such manner as to remain inoperative during the first phase of the reduction in the speed of the train, and to become operative only when there is a considerable reduction in the kinetic energy of the rotating masses, corresponding to 20 kilometres per hour, for example, which may be less than the actual speed of the train owing to partial skidding of the wheels on the rails. The escape valve V remains inoperative during the first phase of braking due to the spring 18 being so calibrated that the slide valve 11 does not connect the orifices 13 and 15 until a predetermined lower limit of speed of the regulator 2 is reached. It is from this moment that the air is suddenly evacuated from the brake cylinders by the displacement of the slide valve 11; and the wheels again tend to acquire the speed of the train, reduced for example to 50 kilometres per hour, and the slide valve 11 is again displaced to shut off the escape of air past the escape valve 16.

The pressure in the brake cylinder consequently acquires a new value. The same effects of regulation will then be reproduced automatically until, if there is a question of a stoppage, the lower limit speed of 20 kilometres per hour becomes that of the train itself. At this moment the escape valve V again becomes operative but all is arranged in order that, in the continuous action of the slide valve 11, the reduction of the pressure only operates in a slow and jerky manner. The spring 16 is so regulated that it always maintains a certain minimum useful pressure in the brake cylinder.

Moreover, the parts are combined so that the calibrated spring 18 of the regulator 2 only commences its regulating effect at that moment when the speed of the wheel has fallen to the predetermined lower limit aforesaid.

This self-regulating valve can be applied at small expense to all existing brake systems working with compressed air, for example (Westinghouse) without modifying either their own method of action or the play of the driver's control lever, which may be retained for any other accessory regulations.

The apparatus can be mounted in different ways, as may be preferred by the exploiting companies. It will start rotating only at the moment when the brakes come into action. For this purpose, the centrifugal regulator 2 (Figs. 2 and 3) is mounted on a shaft 1' parallel to the axle 1 and supported by two bearings 21 and 22 carrying rods 23 and 24 capable of oscillating about the spindles 25 and 26 of two supports 27 and 28 fixed to a traverse 29 of the framework. The rod 24 is joined to a rod 30 controlled by a rod 31 by the intermediary of a spring 32. This rod 31 receives its movement from a lever 33 actuated by the piston 34 of a brake cylinder H which at the same time actuates the brake gear through the rod 36. The shaft 1' carries a roller 37 adapted to be put into contact with the tire of a wheel 38. The collar 6 of the regulator 2 displaces the fork 7, which is mounted with a swivel joint on the traverse 29 and, the fork 7 controls the slide valve 11 by means of the rod 10 as previously described.

The brake cylinder H is joined on one side by the pipe 14 to the orifice 13 of the chamber of the slide valve 11, and on the other side by a pipe 39 to the triple valve or distributor D and the auxiliary tank T. When the air under pressure is admitted into the brake cylinder H (Fig. 2) the piston 34 acts on the lever 33 which by the intermediary of the rods 31 and 30 brings the roller 37 into contact with the tire of the wheel 38, and the regulator 2 comes into action. It is obvious that rod 24 can be controlled by any control lever that it is desired to use, for example, either by the levers of the brake shoes, or by any other rod of this gear.

In Fig. 4 which is a modification of 2 and 3, the shaft 1' is not set into rotation by a friction roller, but by a belt 40 passing round a pulley 42 on the axle 1 or on any other rotative part. The pulleys 41 and 42 should have very broad flanges in order to prevent the belt from falling off.

A device similar to that of Figs. 2 and 3 may be used to extend the belt 40 at the moment the brake comes into action, and to make the regulator 2 rotate only at that moment.

It will be understood that the constructions shown in Figs. 2, 3, and 4 are only by way of example and that further modified constructions obtaining the same result can be easily devised and fall within the scope of the present invention.

The regulator, instead of being actuated by centrifugal force, may be of the Hallot "inertia" type, such as that described in French Patent No. 628,744. To this end, Fig. 5, on the axle 1' or on any shaft partaking of the rotation thereof, is mounted a screw 43 on which can be screwed a flywheel 44 threaded in its bore. On relative screwing movement being caused by inertia, the flywheel is displaced axially either towards the right or towards the left. A casing 45, fixed on the axle 1 envelopes the system. The faces of the casing 45 is pierced with holes through which the spindles 46 and 47 pass. These are joined respectively to two flanged pulleys 48 and 49 which are maintained in position by springs 50 and 51 acting on the spindles 46 and 47. Two forks 52 and 53 engage in the grooves of the pulleys 48 and 49, and are meant to transmit the axial movements of said pulleys.

The fork 52 is articulated at 54 on the framework, and controls a rod 55 connected to the slide valve previously described. The fork 53, is pivoted at 56, and the lever 57, which is an extension of the fork 53 is connected by a rod 58 to the fork 52.

The action is as follows:—In normal operation, in consequence of the friction existing between the screw 43 and the screw part of the flywheel 44, the flywheel rotates with the shaft 1' without any relative screw motion. If the rotation takes place in the direction of the arrow and if too violent a brake action has a tendency to jam the wheels and consequently the axle 1', the screw 43 tends to stop. The flywheel 44 having stored up a certain energy will turn on the screw 43 and will be displaced towards the left, and will engage the spindles 46 and compress the springs 50. The spindles 46, the pulley 48, and the fork 52 will then be displaced towards the left and the movement of the rod 55 will operate the slide valve to that position which permits the excess air in the brake cylinder to escape.

The wheels having resumed movement, the flywheel 44 will release the spindles 46 and consequently the system will resume its first position and the brake cylinder will be isolated from the atmosphere. The flywheel 44 will resume the speed of the axle 1' and the same effects will be capable of being produced.

In the case of rotation in the reverse direction to that of the arrow and in the case of tendency to jamming of the wheels, the flywheel 44 will operate the rods 47 and the pulley 49. The latter will displace the fork 53, which will act by the lever 57 and the rod 58 on the fork 52 and on the rod 55, which will produce on the slide valve the same movement as previously described. The pressure in the brake cylinder at each instant will be at the maximum value required for the load of the vehicle and the adhesion of the wheels. Consequently, the braking will be maximum, and jamming of the wheels will be avoided.

Figure 6 is a special control for the inertia regulator described in applicant's French Patent No. 628,744, the control screw of which can be actuated at the moment of braking only by an automatic reverse, controlled itself by any device of well-known kind, such as that of Fig. 5 for example. This reverse is necessary for this special type of regulator, in order that it may turn always in the same direction whatever be the direction of rotation of the wheels.

To this end, the shaft 1' which receives the movement of the wheels by any appropriate device, flexible tube, belt or gears, carries two bevel pinions 62 and 63 mounted on it and always in engagement with a bevel wheel 64 mounted on a shaft 65. The shaft 1' and 65 are maintained in position in bearings supported by a casing 66 fixed to the framework of the vehicle. Each of the pinions 62 and 63 carries a serrated coupling or of any other equivalent system 67 and 68 integral with the shaft 1', but capable of sliding on it in the holes 69 and 70 of the shaft 1'. Springs 71 and 72 maintain the engagement. Whatever be the direction of rotation of the shaft 1', one or other of the gears 67 or 68 engages and drives the conical pinion with which it is coupled, and the movement transmitted to the shaft 65 is always in the same direction. The shaft 65 carries a screw 73, on which there can be displaced a threaded flywheel 74, the angular movement of which is limited by a cotter 75, carried by a shaft 76 carrying the flanged pulley 6 which transmits this movement to the control fork 7 of the regulator slide valve.

The movement of the flywheel 74 has been explained above, and its function as regulator of fluid pressure has been described in detail in applicant's French Patent No. 623,744. The axial movements transmitted to the fork 7 by the flywheel 74 during the periods of jamming or non-jamming will produce the evacuation of the excess air in the brake cylinder or the maintenance of the pressure as long as the jamming pressure is not reached.

I claim:—

1. In a continuous brake system for railway trains, the combination of an escape valve in communication with a brake cylinder and loaded so as to maintain a predetermined minimum pressure therein, brake gear and brakes operated by said brake cylinder, a valve for opening and closing said communication, an inertia regulator adapted to operate said valve to open said communication on attaining a predetermined minimum speed, friction driving means from a wheel of the vehicle to said regulator operable to drive the regulator in the same direction irrespective of the direction of rotation of the wheel, and connective means between the brake gear and said driving means whereby the regulator is driven only when the brakes are applied to the vehicle wheel.

2. In a continuous brake system for railway trains, the combination of an escape valve in communication with a brake cylinder and loaded so as to maintain a predetermined minimum pressure therein, brake gear and brakes operated by said brake cylinder, a valve for opening and closing said communication, an inertia regulator comprising a flywheel mounted on a screwed shaft so as to have a limited movement relative thereto and adapted to operate said valve to open said communication on attaining a predetermined minimum speed, friction driving means from one of the rotating parts of the vehicle to said screwed shaft, and connective means between the brake gear and said driving means whereby the regulator is driven only when the brakes are applied to the vehicle wheel.

3. A combination according to claim 2, wherein there is combined with the inertia regulator a reverse gear for the movement of rotation which comprises two bevel pinions loosely mounted on a driving shaft and always in engagement with a bevel wheel mounted on the screwed shaft aforesaid, and spring-pressed serrated couplings which act as one-way clutches in engagement with said bevel pinions.

4. In a continuous braking system for railway trains, the combination of an escape valve in communication with the brake cylinder and loaded so as to maintain a predetermined minimum pressure therein, a valve opening and closing said communication, a rotary shaft regulator adapted to operate said valve to open said communication when the speed falls to a predetermined minimum value, driving means from a wheel of the vehicle to said regulator, and automatic reversing means in said driving means whereby said regulator is driven in the same direction irrespective of the direction of rotation of the wheel.

5. In a continuous braking system for railway trains, the combination of an escape valve in communication with the brake cylinder and loaded so as to maintain a predetermined minimum pressure therein, a valve for opening and closing said communication, an inertia regulator comprising a flywheel mounted on a screwed shaft, members movable by said flywheel when moved in either direction on the screwed shaft, connective means between said members and said valve whereby said valve is operated to open said communication when either of said members is moved, and means for driving said screwed shaft from one of the rotating parts of the vehicle.

PAUL HALLOT.